United States Patent
Athas et al.

(10) Patent No.: US 11,636,176 B2
(45) Date of Patent: Apr. 25, 2023

(54) INTERPOLATION METHOD AND APPARATUS FOR ARITHMETIC FUNCTIONS

(71) Applicant: Apple Inc., Cupertino, CA (US)

(72) Inventors: William C. Athas, San Jose, CA (US); Zaid M. Nadeem, Santa Clara, CA (US); Tetiana Parshakova, Stanford, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 17/085,971

(22) Filed: Oct. 30, 2020

(65) Prior Publication Data

US 2022/0100818 A1     Mar. 31, 2022

Related U.S. Application Data

(60) Provisional application No. 63/083,370, filed on Sep. 25, 2020.

(51) Int. Cl.
   *G06F 17/17*   (2006.01)
   *G06F 7/523*   (2006.01)
   *G06F 7/50*    (2006.01)

(52) U.S. Cl.
   CPC ............... *G06F 17/17* (2013.01); *G06F 7/50* (2013.01); *G06F 7/523* (2013.01)

(58) Field of Classification Search
   CPC ...... G06F 2207/5523; G06F 2207/5525; G06F 7/38; G06F 7/50; G06F 7/505–508; G06F 7/5325; G06F 17/17
   USPC .......................................................... 708/606
   See application file for complete search history.

(56) References Cited

U.S. PATENT DOCUMENTS

| | | | | |
|---|---|---|---|---|
| 2,890,829 A | * | 6/1959 | Robert | G06F 7/552 |
| | | | | 708/606 |
| 3,780,278 A | * | 12/1973 | Way | G06F 7/552 |
| | | | | 708/606 |
| 6,748,410 B1 | | 6/2004 | Gressel et al. | |
| 8,190,669 B1 | | 5/2012 | Oberman et al. | |
| 9,916,131 B2 | | 3/2018 | Walters, III | |
| 2003/0016822 A1 | * | 1/2003 | Dent | G06F 7/722 |
| | | | | 380/46 |
| 2017/0293471 A1 | * | 10/2017 | Hormigo Aguilar | G06F 7/50 |

* cited by examiner

*Primary Examiner* — Emily E Larocque
(74) *Attorney, Agent, or Firm* — Kowert, Hood, Munyon, Rankin & Goetzel, P.C.

(57) ABSTRACT

An interpolation circuit included in a computer system may receive an operand that includes a plurality of bits occupying respective ones of a plurality of ordered bit positions, and generate multiple conditionally-negated values of respective portions of the operand starting at corresponding bit positions. The interpolation circuit may combine the operand and the plurality of conditionally-negated values to generate an approximation of a result of an arithmetic operation performed on the operand.

15 Claims, 15 Drawing Sheets

INTERPOLATION METHOD AND APPARATUS FOR ARITHMETIC FUNCTIONS

PRIORITY INFORMATION

This application claims the benefit of U.S. Provisional Application No. 63/083,370, filed on Sep. 25, 2020, which is incorporated by reference herein in its entirety.

BACKGROUND

Technical Field

Embodiments described herein relate to switching circuits, and more particularly, to techniques for performing operations using interpolation.

Description of the Related Art

Modern computer systems may perform a variety of computation-intensive tasks. Such tasks may include speech recognition, image recognition, and the like, which may require numerous computation operations, such as, multiply-and-accumulate operations. Computer systems may perform operations using a variety of techniques.

Some computer systems may rely on software or program instructions to perform computation operations. In such cases, the software or program instructions may iteratively use arithmetic circuits included in the computer system to implement more complicated computation operations. For example, in some computer systems, a multiplication operation may be performed using successive addition operations.

In other computer systems, dedicated hardware circuits may be employed to perform some computation operations. For example, some computer systems may include circuits configured to multiply two operands to generate a product. In some cases, the dedicated hardware circuits may be used in conjunction with software or program instructions to perform more complicated computation operations.

SUMMARY OF THE EMBODIMENTS

Various embodiments of a circuit for generating an approximation of an arithmetic function are disclosed. Broadly speaking, a plurality of logic circuits may be configured to receive an operand that includes a plurality of bits occupying respective ordered bit positions. A particular logic circuit of the plurality of logic circuits may be configured to generate a conditionally negated value of the operand starting at a particular bit position of the ordered bit positions, and generate a corresponding term of one or more terms using the conditionally negated value and a value of a bit occupying the particular one of the ordered bit positions. An output circuit may be configured to combine the operand and the plurality of terms to generate an approximation of a result of an arithmetic function performed on the operand. In another embodiments, the output circuit may be further configured to combine the operand with a weighted sum of the plurality of terms.

BRIEF DESCRIPTION OF THE DRAWINGS

The following detailed description makes reference to the accompanying drawings, which are now briefly described.

Figure 1:
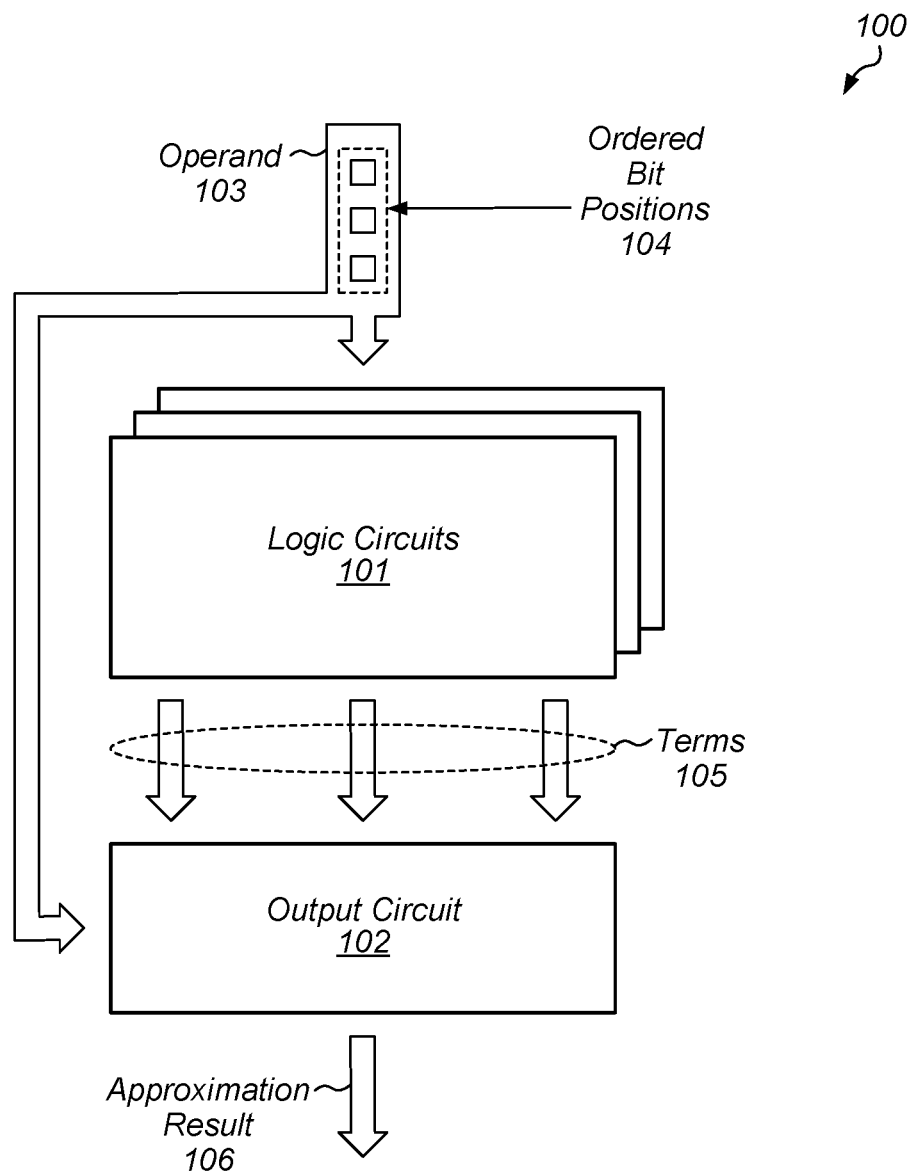
FIG. 1 is a block diagram of an embodiment of an interpolation circuit.

While the disclosure is susceptible to various modifications and alternative forms, specific embodiments thereof are shown, by way of example, in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Computer systems need to perform numerous computation intensive operations, such as generating a square of a number, when performing scientific calculations, doing linear algebra calculations, executing machine learning algorithms, and the like. For example, one frequently encountered calculation is determining the norm of a vector $\vec{v} = [v_1, v_2, \ldots v_n]$. The norm of $\vec{v}$ is given by $\|\vec{v}\| = \sqrt{v_1^2 + v_2^2 + \ldots v_n^2}$ and includes calculating the square of each element of the vector $\vec{v}$. Different techniques have been developed to address this fundamental computation need. In cases where an exact answer for a particular operation may not be needed, circuits (or algorithms) may be employed that approximate the answer to a desired level of accuracy with a savings of implementation cost, circuit size, power dissipation, or delay (speed).

Circuits that calculate approximate answers may use different techniques in performing the approximation. For example, some circuits employ successive approximation using a binary search or other suitable algorithm. In other cases, a circuit may employ an interpolation technique, which can improve accuracy of a result while not increasing the complexity of the circuit. Some interpolation techniques (e.g., linear piecewise approximation) combine multiple linear ramp functions to generate an approximation of a particular function.

The digital logic algorithms used by computer systems, however, are built using step functions, making it difficult to perform linear piecewise approximation. Techniques in the present disclosure are based on the recognition that there is a link between the realm of linear piecewise approximation and digital logic. This link allows the creation of a set of functions from a linear ramp function and a binary-step function. This set of functions can be used as a basis for approximating a function. A logic circuit that approximates the function may advantageously allow for new trade-offs between accuracy and circuit complexity.

Using the disclosed techniques, an organizational principle to implement a logic circuit for approximating certain arithmetic functions can be developed by combining the absolute value function with a binary step function. For example, such a combination produces a function whose terms correspond to an absolute value representation of a signed binary number. The embodiments illustrated in the drawings and described below provide techniques for using a logic circuit to perform interpolation to approximate a result of an arithmetic function using a basis that is implemented using the absolute value representation of a signed binary number. The absolute value function is an example of a conditional negation in which the negation depends on the sign bit which is the most significant bit. For a two's complement number system, the negated value must be incremented by one.

A block diagram depicting an embodiment of an interpolation circuit is illustrated in FIG. 1. As illustrated, interpolation circuit 100 includes logic circuits 101 and output circuit 102.

Logic circuits 101 are configured to receive operand 103 that includes a plurality of bits occupying respective ones of ordered bit positions 104. In various embodiments, ordered bit positions 104 may start at position 0 and increment by one for each subsequent position. In some cases, the lowest-order bit may be referred to as the "least significant bit," while the highest-ordered bit may be referred to as the "most significant bit."

As described below in more detail, interpolation circuit 100 may be configured to generate multiple terms that correspond to multiple absolute values of the operand starting at respective bit positions of the operand. To generate such values, a particular one of logic circuits 101 is configured to generate an absolute value of a corresponding portion of operand 103 starting at a particular one of ordered bit positions 104. The particular one of logic circuits 101 is also configured to generate a corresponding term of terms 105 using the complemented or negated value and a value of a bit occupying the particular one of the ordered-bit positions. It is noted that although only three circuits are depicted as being included in logic circuits 101, in other embodiments, any suitable number of logic circuits may be employed. In some cases, the number of logic circuits included in logic circuits 101 may be, at least in part, a function of a desired accuracy of approximation results 106 as well as a number of bits included in operand 103.

Output circuit 102 is configured to combine operand 103 and terms 105 to calculate approximation result 106. In various embodiments, output circuit 102 may combine terms 105 in any suitable fashion. For example, as described below in more detail, output circuit 102 may combine terms 105 to operand 103 to calculate approximation result 106. In some cases, approximation result 106 is an approximation of a result of an arithmetic operation performed on operand 103. For example, in some cases, approximation result 106 may be an approximation of a square of operand 103.

As described below, the use of the absolute value of operand 103 allows interpolation circuit 100 to generate approximation result 106 with an accuracy to other circuit implementations, while employing less circuitry. As used and described herein, the absolute value of a signed binary number is a complement of the binary number with respect to $2^{N-1}$, where N is a positive integer corresponding to a number of bits included in the binary number. In general, the absolute of a signed binary number may be generated by conditionally inverting the logical value of each bit of the binary number and then adding one based on the value of the leading bit position.

Figure 2:
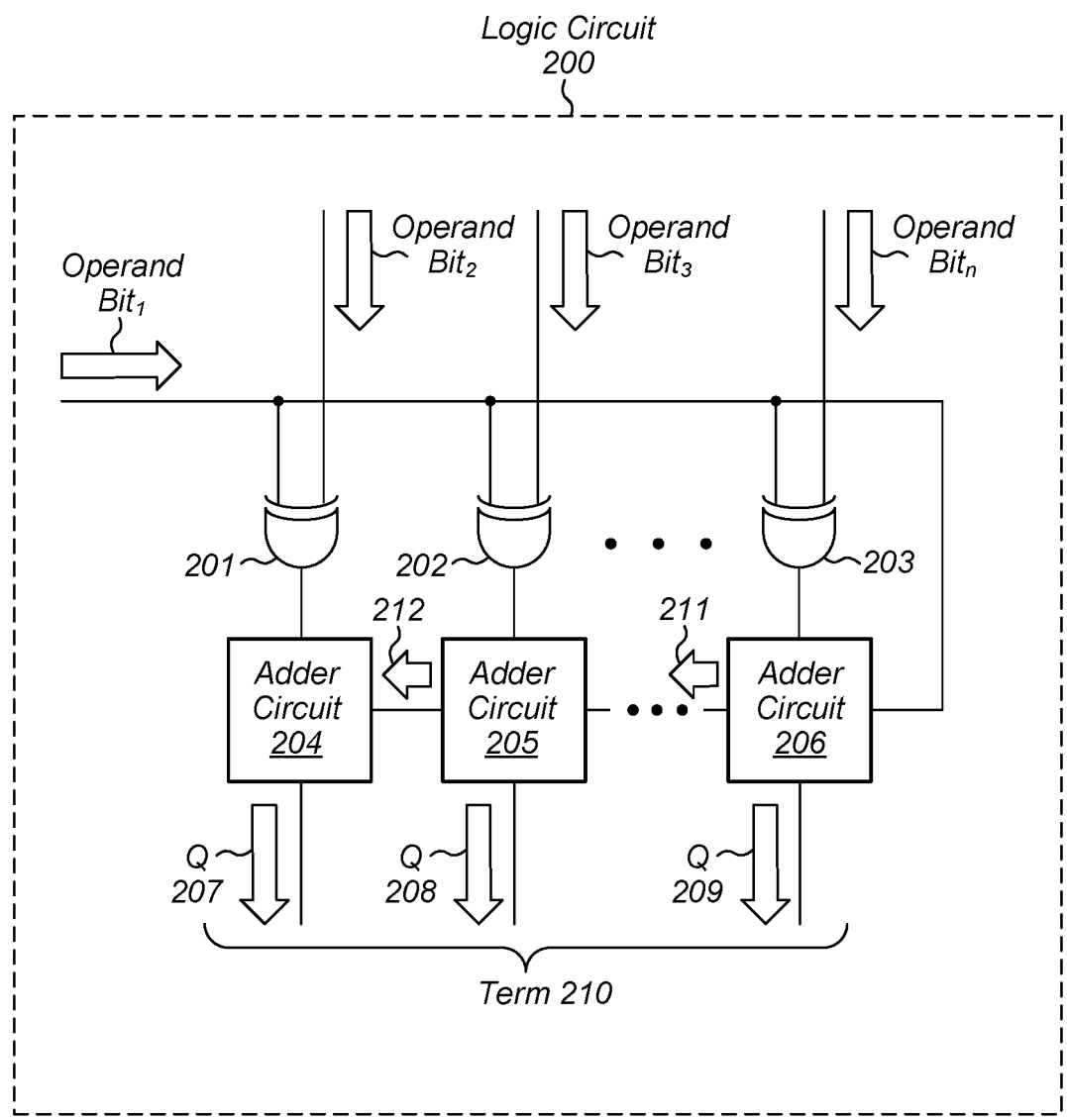
FIG. 2 is a block diagram of an embodiment of a logic circuit used in an interpolation circuit.

Various circuit topologies may be used to, approximately or exactly, generate an absolute value of a signed binary number. Logic circuits 101 may include any of these suitable topologies to generate the negation of operand 103. Turning to FIG. 2, a block diagram illustrating an embodiment of a particular one of logic circuits 101 is depicted. As illustrated, logic circuit 200 includes exclusive-OR gates 201-203, and adder circuits 204-206. Note that although only three exclusive-OR gates and three adder circuits are depicted in the embodiment of FIG. 2, in other embodiments, any suitable number of exclusive-OR gates and adders circuits may be employed.

Inputs of exclusive-OR gate 201 couple to operand $bit_1$ and operand $bit_2$ of operand 103. In a similar fashion, inputs of exclusive-OR gate 202 couple to operand $bit_1$ and operand $bit_3$ of operand 103, and inputs of exclusive-OR gate 203 couple to operand $bit_1$ and operand $bit_n$ of operand 103.

Each of exclusive-OR gates 201-203 may be particular embodiments of a combinatorial logic circuit configured to perform the exclusive-OR logic function. In various embodiments, a given one of exclusive-OR gates 201-203 may be implemented as a complex logic gate using multiple metal-oxide semiconductor field-effect transistors (MOSFETs). Alternatively, gates 201-203 may be implemented using any suitable combination of NAND gates, OR gates, or any other suitable logic gate configured to perform the exclusive-OR logic function.

Inputs of adder circuits 204-206 are coupled to respective outputs of exclusive-OR gates 201-203, and the carry-in inputs of adder circuits 204-206 are coupled to the carry-out signal (e.g., carry-out signals 211-212) generated by a proceeding one of adder circuits 204-206. For example, the input of adder circuit 204 is coupled to the output of exclusive-OR gate 201, and the carry-in input of adder circuit 204 is coupled to the carry-out of adder circuit 205. It is noted that one of the inputs of adder circuit 206 is coupled to operand $bit_1$ in order to convert the given portion of operand 103 into two's complement format.

Each of adder circuits 204-206 may be implemented as single-bit adder circuits configured to add an input bit and a carry-in bit to generate an output bit and a carry-out bit. In various embodiments, adder circuits 204-206 may include any suitable combination of logic gates, MOSFETs, and the like configured to perform the addition operation.

Note that in the illustrated embodiment, all N-bits of operand 103 are used. As described below in more detail, each of terms 105 generate the two's complement of different portions of operand 103 starting at respective bit positions within operand 103. For example, a second term of terms 105 may be generated starting at bit position two within operand 103. In such a case, exclusive-OR gate 201 and adder circuit 204 may be omitted, as operand $bit_1$ would not be used in the second term. Since each subsequent term is generated using the next-higher bit position, each subsequent instance of logic circuit 200 includes less circuitry, thereby decreasing the overall size of logic circuits 101.

Since the two's complement of a number is the one's complement of a number plus one, in some embodiments, the approximation may be generated using only the one's complement value. In such cases, adder circuits 204-206 may be re-located to a different location that is more convenient, or may be omitted entirely, with some loss of accuracy in the approximation.

Figure 3:
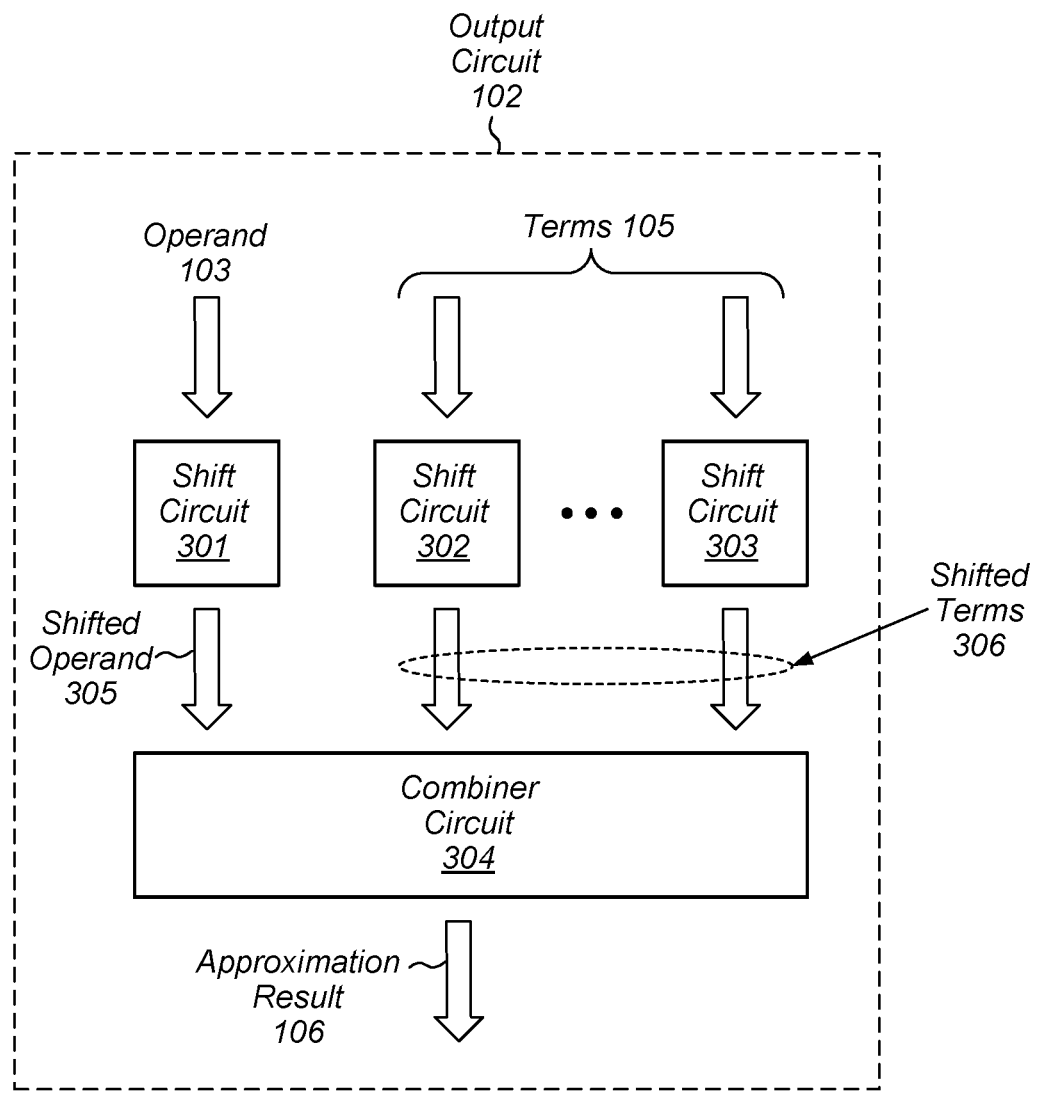
FIG. 3 is a block diagram of an embodiment of an output circuit used in an interpolation circuit.

FIG. 3 depicts an embodiment of output circuit 102. As illustrated, output circuit 102 includes shift circuits 301-303 and combiner circuit 304. Although only three shift circuits are depicted in FIG. 3, in various embodiments, there may be a shift circuit for the operand, along with a shift circuit for each term included in terms 105.

In various embodiments, shift circuits 301-303 may include a chain of flip-flop circuits, in which an output of a particular flip-flop circuit couples to an input of a next flip-flop in the chain. In response to an assertion of a control signal, the chain of flip-flop circuits shifts the bit position of each data bit by one position. Multiple assertions of the control can result in shifting the bit positions by any suitable number. In some embodiments, the shifting could be performed, at least in part, using software or program instructions executing on a controller or general-purpose processor circuit.

Combiner circuit 304 is configured to combine terms 105 and operand 103 to generate approximation result 106. In various embodiments, combiner circuit 304 may be implemented using multiple half-subtractor or full-subtractor circuits, each configured to perform a subtraction operation for each bit of the difference between any of terms 105 and operand 103. Combiner circuit 304 may, in some embodiments, include any suitable combination of logic gates or MOSFETs configured to implement the desired subtraction functionality. It is noted that in other embodiments, combiner circuit 304 may be implemented using an adder circuit to combine terms 105 and operand 103 to generate approximation result 106.

As described above, the circuits depicted in FIGS. 1-3 may be used to calculate the square of a number. While these circuits are certainly useful when the square of a number is needed, having the ability to generate a square a number also allows for performing other computations. For example, as illustrated in Equation 1, the product of two numbers x and y can be determined using a difference between a square of the sum of the two numbers and square of the difference between the two numbers.

$$x \cdot y = \frac{(x+y)^2 - (x-y)^2}{4} \qquad (1)$$

Figure 4:
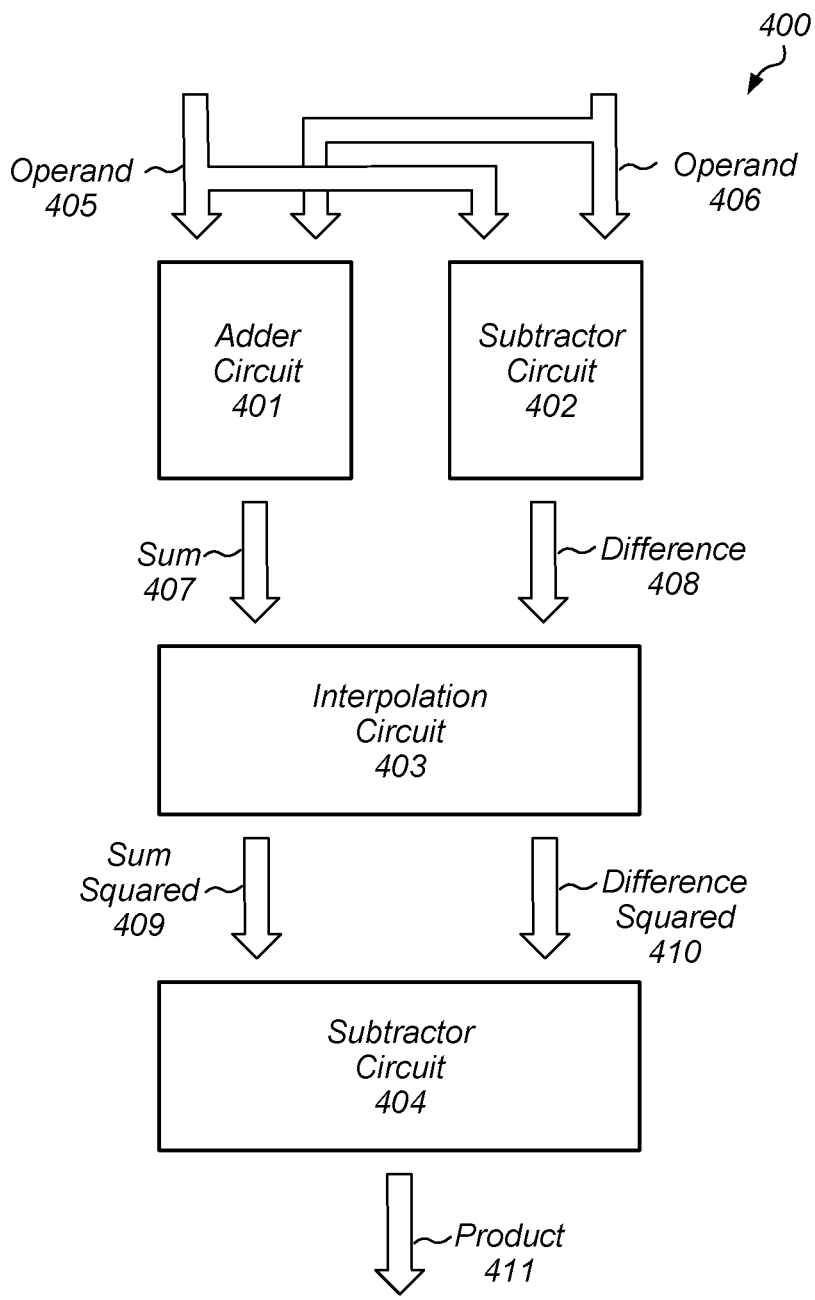
FIG. 4 is a block diagram of an embodiment of a multiplier circuit using a squaring interpolation circuit.

An embodiment of a multiplier circuit that exploits that relationship defined in Equation 1 is depicted in FIG. 4. As illustrated, multiplier circuit 400 includes adder circuit 401, subtractor circuit 402, interpolations circuit 403, and subtractor circuit 404.

Adder circuit 401 may be a full adder circuit, or any other suitable adder circuit, configured to generate sum 407 using operand 405 and operand 406. In various embodiments, operands 405 and 406 may each include any suitable number of bits, and adder circuit 401 may be configured to accommodate the number of bits included in operands 405 and 406.

In a similar fashion, subtractor circuit 402 may be a full subtractor circuit, or any other suitable subtractor circuit, configured to generate difference 408 using operands 405 and 406. In various embodiments, subtractor circuit may be further configured to subtract operand 406 from operand 405 to generate difference 408. As with adder circuit 401, subtractor circuit 402 may be configured to accommodate the number of bits included in operands 405 and 406.

Interpolation circuit 403 may be an embodiment of interpolation circuit 100 as illustrated in FIG. 1, configured to generate sum squared 409 using sum 407, and generate difference squared 410 using difference 408. In various embodiments, interpolation circuit 403 may include multiple instances of interpolation circuit 100 in order to generate sum squared 409 and difference squared 410 in parallel rather than in a sequential fashion. Note that the number of logic circuits included in interpolation circuit 403 may be based, at least in part, on respective desired accuracies of sum squared 409 and difference squared 410. Further note that the approximation accuracy of the final multiple operation may also be impacted by the number of logic circuits included in interpolation circuit 403.

Subtractor circuit 404 may be a full subtractor or other suitable subtractor circuit configured to subtract difference squared 410 from sum squared 409 to generate product 411, in accordance with Equation 1. In some embodiments, subtractor circuit 404 may be further configured to divide the product 411 by two.

It is noted that, for clarity, supporting circuits have been omitted from block diagram of FIG. 4. In various embodiments, register circuits may be included on the inputs and the output of multiplier circuit 400. Alternatively, or additionally, register circuits may be included between the different stages within multiplier circuit 400. For example, register circuits may be included between adder circuit 401 and interpolation circuit 403, as well as between subtractor circuit 402 and interpolation circuit 403.

Figure 5A:
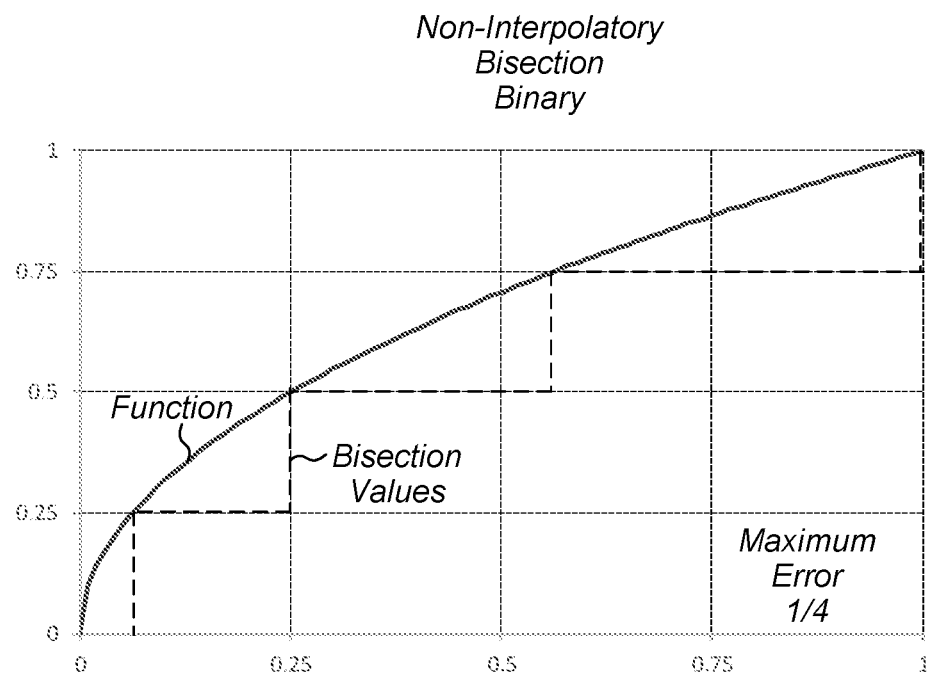
FIG. 5A depicts a graph illustrating a non-interpolatory bisection approximation of a function.

As described above, different techniques may be employed to design a logic circuit configured to generate an approximation of a particular mathematical function. Such techniques may provide different levels of accuracy for similar complexity of the logic circuit. An example of a non-interpolatory bisection binary approach is depicted in FIG. 5A. As illustrated, at different points over the unit interval, corresponding bisection values match values of the function that is to be approximated. Note that the function depicted in FIG. 5A is $\sqrt{x}$, but such approximation techniques, e.g., non-interpolatory bisection binary, may be applied to other functions. At other points on the unit interval, however, the bisection values differ from the values. In some cases, an error associated with the bisection values may be as large as 0.25. While the logic circuits used to implement the bisection approach may be of a desired complexity, the resultant approximation value of the function may be undesirable.

Figure 5B:
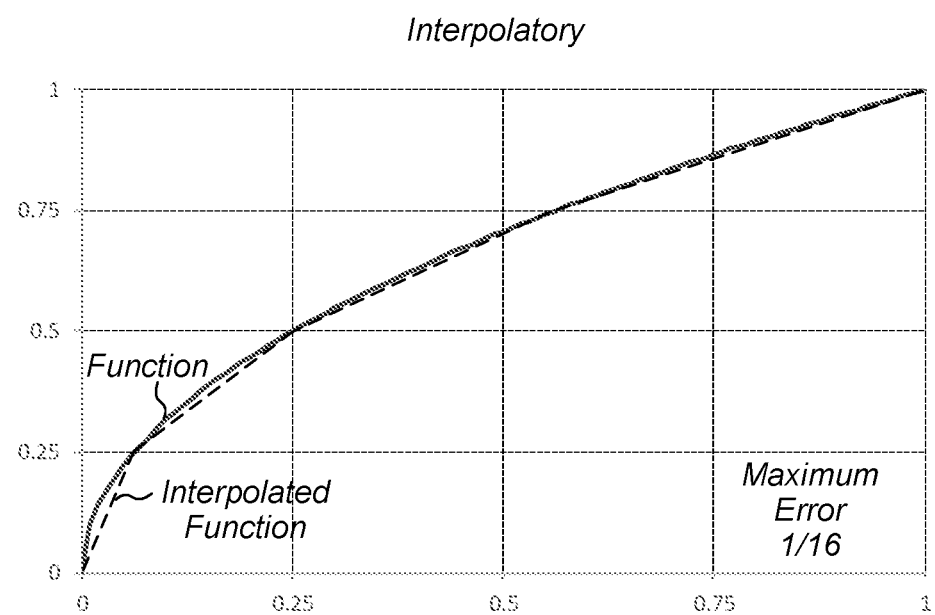
FIG. 5B depicts a graph illustrating an interpolatory approximation of a function.

Turning to FIG. 5B, an example of an interpolatory approach to approximating the function is depicted. As illustrated, the values of the interpolated function are closer to the actual function values than those generated by the binary bisection approach depicted in FIG. 5A. In some cases, a maximum error associated with interpolated function is $1/16$. Different circuit techniques may be used to realize the interpolated function depicted in FIG. 5B. One such technique, as depicted above, employs the use of the two's complement of an operand for the function.

As described above, the absolute value of a binary number may be used to calculate the square of the binary number through successive approximation. As depicted in Equation 2, an unsigned N-bit binary number x may be represented as a fractional value greater than or equal to zero and strictly less than one.

$$x = \sum_{n=1}^{N} 2^{-n} b_n \qquad (2)$$

The successive approximation of the $x^2$ function may be realized using linear piecewise approximation based on hat functions. It is noted that the hat function may be referred to under a variety of names, including chapeau, triangle, mirror, or tent. The parabolic function f(x) shown in Equation 3 is a particular example of a function that exhibits the properties of convexity and symmetry about the midpoint $x = \frac{1}{2}$ $$f(x) = x(1-x) \qquad (3)$$

Figure 6:
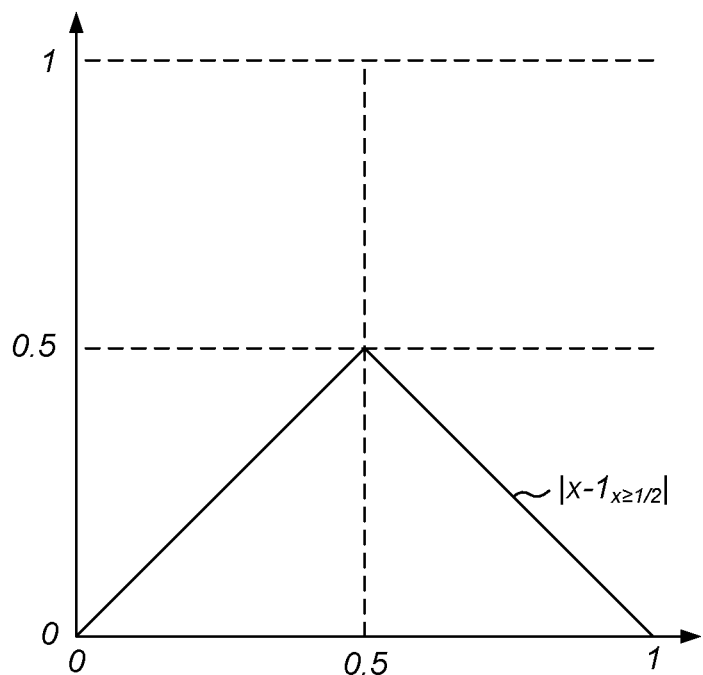
FIG. 6 illustrates a graph depicting a hat function on the interval [0,1].

A graphical depiction of a hat function is illustrated in FIG. 6.

Figure 7:
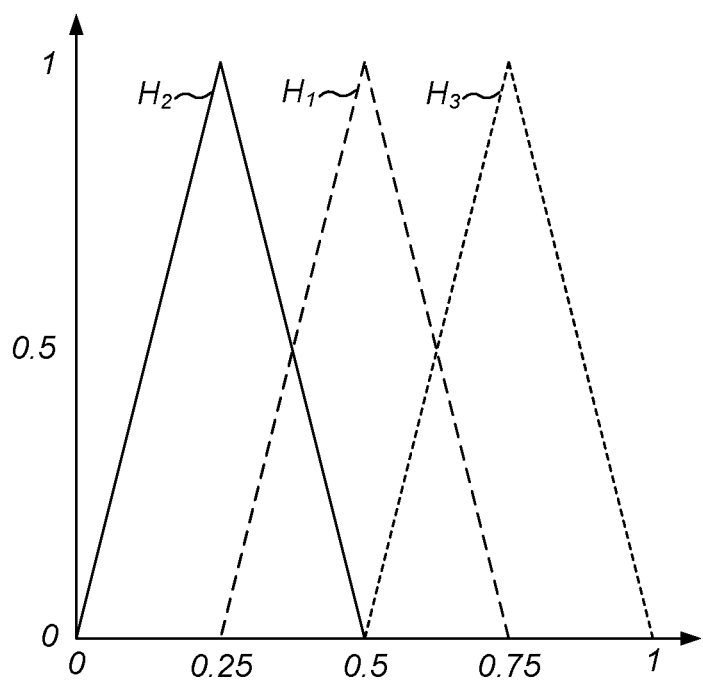
FIG. 7 illustrates a graph depicting a composition of functions forming a nodal basis for the hat function.

According to spline theory, an optimal spacing of the breakpoints of the hat function is an equal or uniform spacing over the unit interval. The graph depicted in FIG. 7 is an example that uses four breakpoints. Based on the graph depicted in FIG. 7, it can be shown that f(x) may be approximated using Equation 4.

$$f(x) \approx \frac{1}{4} H_1 + \frac{3}{16}(H_2 + H_3) \qquad (4)$$

Figure 8:
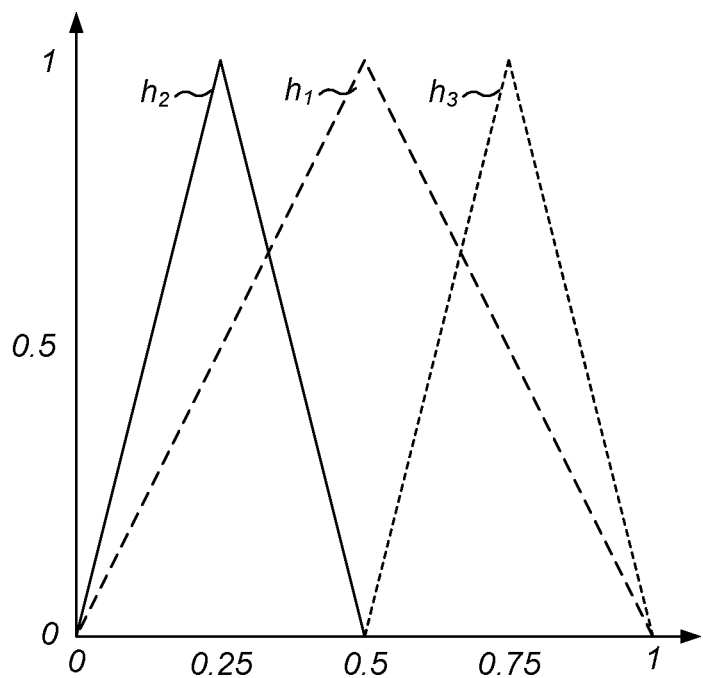
FIG. 8 illustrates a graph depicting a hierarchical basis for the hat function.

Equation 4 is a linear piecewise approximation of a hat function using the nodal basis depicted in FIG. 7. In contrast, the hat functions depicted in FIG. 8 define a hierarchical basis. For the case of evenly spaced hat functions, the two bases are equivalent. Given this equality, the terms $H_1$, $H_2$, and $H_3$ may be defined in terms of the hierarchical basis functions of FIG. 8 as shown in Equation 5.

$$H_2 = h_2 \qquad (5)$$
$$H_3 = h_3$$
$$H_1 = h_1 - \frac{1}{2}(h_2 + h_3)$$

Using Equations 4 and 5, f(x) can be approximated using Equation 6.

$$f(x) \approx \frac{1}{4} h_1 + \frac{1}{16}(h_2 + h_3) \qquad (6)$$

Equation 6 may be generalized to $N=2^k$ breakpoints. The result of such a generalization is shown in Equation 7, where $h^k$ denotes the uniform spacing of $2^k$ non-overlapping hat functions on the unit interval. For example, $h^2(x)$ is the same as $H_1+H_2$ (or $h_1+h_2$).

$$x(1-x) \approx \sum_{k \geq 1}^{N} 4^{-k} h^k(x) \qquad (7)$$

The composition of the hat function with itself, i.e., $h^{\circ 2}(x)=h(h(x))$, is the equal spacing of two triangles on the same unit interval with the same amplitude. Stated another way, applying the triangle function to another hat function generates two hierarchical triangles (e.g., $h_2$ and $h_3$ depicted in FIG. 8). Applying the hat function again results in four hierarchical triangles. The composition of the hat function results in triangles that double with each repeated composition.

There are various ways to express the hat function over the unit interval. Equation 8 depicts one example.

$$h(x) = 1 - 2\left|x - \frac{1}{2}\right| \qquad (8)$$

Figure 9:
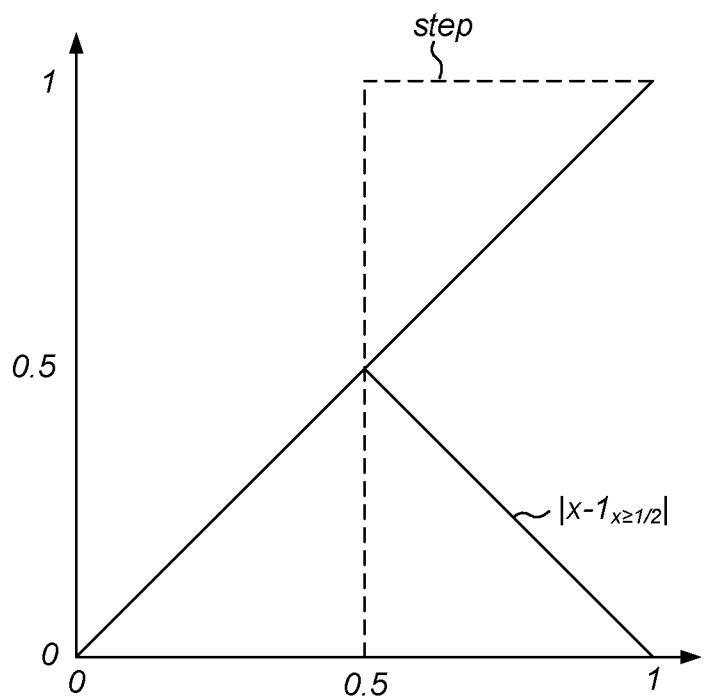
FIG. 9 illustrates a graph depicting the combination of a linear ramp and a step function to form a hat function.

A linear piecewise approximation is built using functions that are linear ramps. A particular linear ramp that may be used in linear piecewise approximation is the absolute value function. In contrast, digital logic algorithms are built using step functions, i.e., binary decisions or comparisons whose outputs are either a logical-0 value or a logical-1 value. The inventors realized there is a link between the realm of linear piecewise approximation and digital logic, in that a hat function may be computed from a linear ramp function and a binary-step function. An example of such a hat function is depicted in Equation 9A and FIG. 9.

$$h(x) = \begin{cases} 2x & \text{for } x \in \left[0, \frac{1}{2}\right) \\ 1-2x & \text{for } x \in \left[\frac{1}{2}, 1\right) \end{cases} \quad (9A)$$

With further simplification, Equation 9A can be rewritten as Equation 9B.

$$h(x) = \begin{cases} 2|0-x| & \text{for } x < \frac{1}{2} \\ 2|1-x| & \text{for } x \geq \frac{1}{2} \end{cases} \quad (9B)$$

For the unsigned binary representation depicted in Equation 1, $b_1$=step ($x \geq \frac{1}{2}$). Using this equality, Equation 9B may be re-written to express h(x) in terms of the most-significant-bit value of x as shown in Equation 10.

$$h(x) = 2\left|\text{step}\left(x \geq \frac{1}{2}\right) - x\right| \quad (10)$$
$$= 2|b_1 - x|$$

Substituting Equation 2 into Equation 10 results in the expression in Equation 11. Equation 11 is the two's complement representation (denoted as TC) of the binary number for x.

$$x_1 = h(x) \quad (11)$$
$$= \left|-b_1 + \frac{b_2}{2} + \frac{b_3}{4} + \ldots + \frac{b_n}{2^{n-1}}\right|$$
$$= TC(b_1 \ldots b_n)$$

Figure 10:
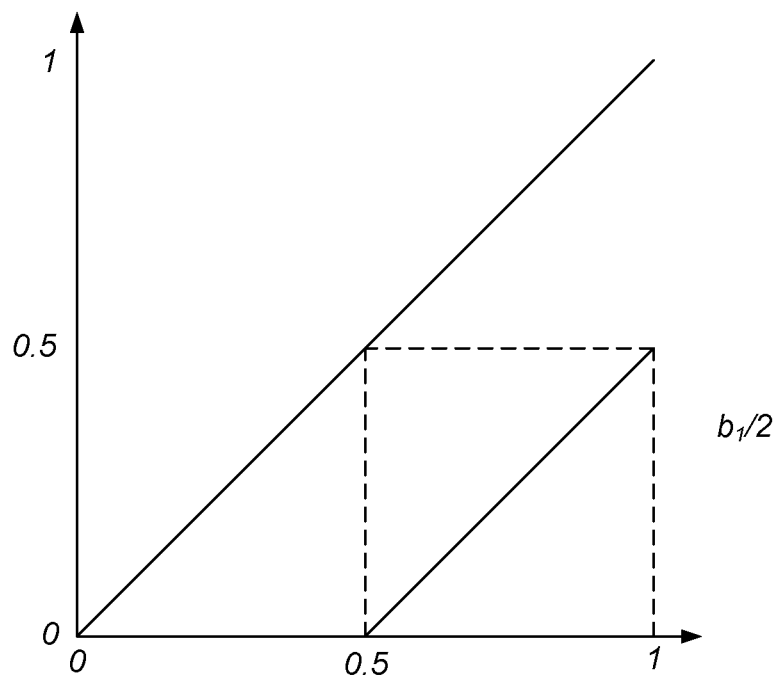
FIG. 10 illustrates a graph depicting two linear ramps over the unit interval.
Figure 11:
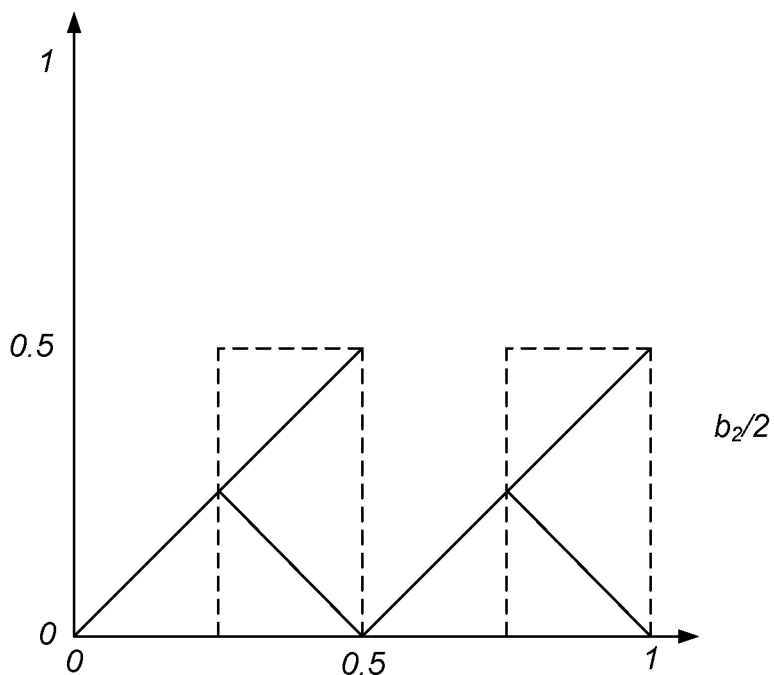
FIG. 11 illustrates a graph depicting example waveforms of the function h(h(x)).

Note that subtracting the term $$\frac{b_1}{2}$$

from x yields two linear ramps over the intervals $$\left[0, \frac{1}{2}\right) \text{ and } \left[\frac{1}{2}, 1\right),$$

respectively. The two linear ramps are illustrated in FIG. 10. As illustrated in Equation 12, by subtracting the term $$\frac{b_2}{2}$$

from each of these ramps, then taking the absolute value and multiplying by four, results in the function $h^{\circ 2}(x)$. FIG. 11 depicts waveforms of $h^{\circ 2}(x)$. As Equation 11 is the two's complement of x, Equation 12 corresponds to the two's complement of a portion of the binary number starting with $b_2$.

$$h^{\circ 2}(x) = 4\left|x - \frac{b_1}{2} - \frac{b_2}{2}\right| \quad (12)$$
$$= \left|-b_2 + \frac{b_3}{2} + \frac{b_4}{4} + \ldots + \frac{b_n}{2^{n-2}}\right|$$
$$= TC(b_2 \ldots N)$$

In Boolean logic, the operation to generate the two's complement of a number first examines the most-significant-bit, e.g., $b_1$, and if the value of $b_1$ is a logical-0, then no operation is performed. If, however, the value of $b_1$ is a logical-1, then respective logical values of the bits occupying the bit positions that are less significant are inverted, and a one is added. This may be expressed as shown in Equation 13.

$$x_1 = b_1 \oplus (b_2 b_3 \ldots b_N) + b_1 \cdot 2^{-N} \quad (13)$$
$$x_2 = b_2 \oplus (b_3 b_4 \ldots b_N) + b_2 \cdot 2^{-N-1}$$
$$\vdots$$
$$x_m = b_i \oplus (b_{m+1} b_{m+2} \ldots b_N) + b_m \cdot 2^{-N-m}$$

Note that to simplify the notation, Equation 13 is not sign extended. As noted above, this can be implemented in a logic circuit by performing shift operations by a power of two, which add little to the complexity of the logic circuit.

It is important to note that the disclosed interpolation approach has a different behavior than a partial products method in the areas of circuit complexity and accuracy. Since $x^2$ x–f(x), a subtractor circuit, e.g., 304, is employed to generate $x^2$. In general, a subtractor circuit is of similar circuit complexity to an adder circuit. It may appear that the disclosed interpolation circuit may employ twice as many adder circuits as the partial products method. The addition operations may, however, be rearranged as shown in Equation 15a, which results in a similar number of addition operations as the partial products method. Note that Equation 15a reduces to Equation 15b when m=N.

$$x^2 \approx x - x_1 - x_2 - x_3 \ldots - x_m = \quad (15a)$$
$$x - y_1 - y_2 - \ldots - b_1 \cdot 2^{-N} - b_2 \cdot 2^{-N-1} - \ldots$$
where $y_k = b_k \oplus (0 \ldots 0 b_{k+1} b_{k+2} \ldots b_N)$ $$x^2 = x \sum_{k=1}^{N} y_k - x \cdot 2^{-N}, \text{ when } m = N \quad (15b)$$

Note that the number of exclusive-OR gates and the width of adder circuits decrease with each additional term. Moreover, each additional term in $x^2$ increases the arithmetic accuracy by a factor of four, which corresponds to two bits of precision per addition or subtraction.

Figure 12:
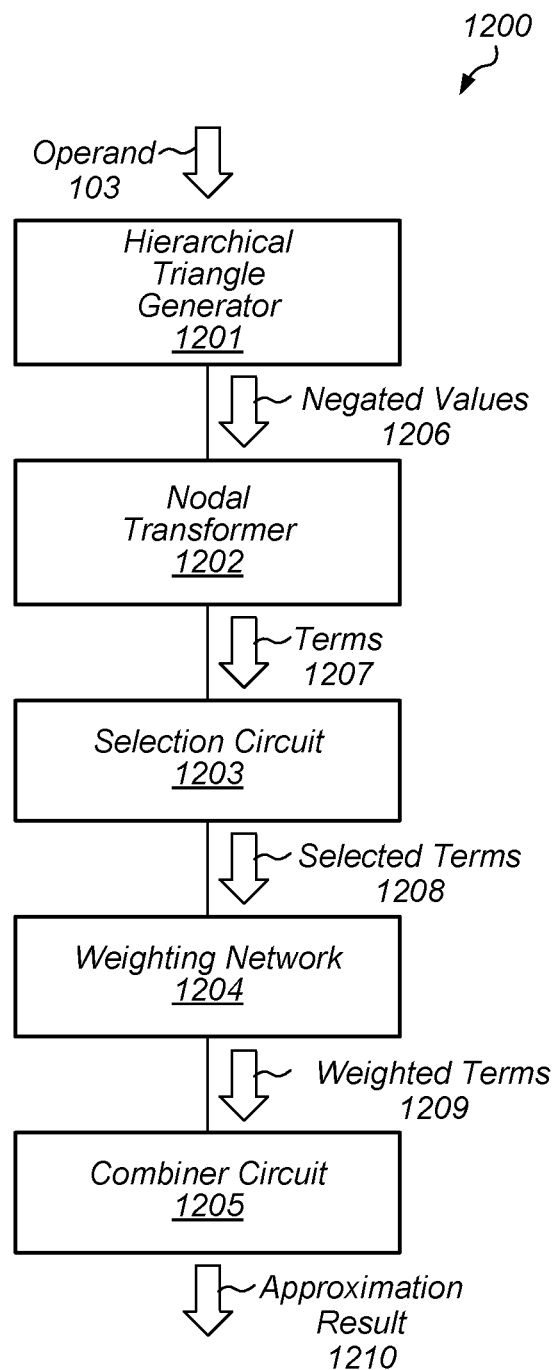
FIG. 12 is a block diagram of another embodiment of an interpolation circuit.

Turning to FIG. 12, another embodiment of an interpolation circuit is depicted. As illustrated, interpolation circuit 1200 includes hierarchical triangle generator 1201, nodal transformer 1202, selection circuit 1203, weighting network 1204, and combiner circuit 1205.

Hierarchical triangle generator 1201 is configured to generate conditionally negated values 1206 using operand 103. Conditionally negated values 1206 can be used as a nodal basis for the hat function (as depicted in FIG. 7). In various embodiments, hierarchical triangle generator 1201 may be configured to generate multiple terms that correspond to multiple negations values of operand 103 starting at respective bit positions of operand 103. As depicted below, the multiple negations correspond to different ones of multiple hierarchical triangles associated with the corresponding terms of Equation 15a. Hierarchical triangle generator 1201 may be implemented using any suitable set of combinatorial logic gates. In some embodiments, the number of levels may be based on a level of accuracy desired in an approximation of a target function.

Nodal transformer circuit 1202 is configured to convert the nodal basis formed by negated values 1206 into a different basis to generate terms 1207. The different basis may be mapped directly to the target function (e.g., $x^2$). In various embodiments, nodal transformer circuit 1202 may be implemented using any suitable combination of combinatorial logic gates.

Selection circuit 1203 is configured to select particular ones of terms 1207 to generate selected terms 1208. In various embodiments, the selection of triangles is based on the target function. For example, for the function $x^2$, all of transformed triangles 1207 are employed, so all of terms 1207 are selected. To approximate other functions, particular ones of transformed triangles 1207 may be omitted from selected terms 1208. Selection circuit 1203 may be implemented using any suitable combination of combinatorial logic gates.

Weighting network 1204 is configured to apply respective weights to selected terms 1208 to generate weighted terms 1209. The value of a given weight is based on the target function to be approximated. In the case of $x^2$, the weights are powers of 2 as depicted in Equations 15a and 15b. To approximate other target functions, different weights may be applied to selected terms 1208. The implementation of weighting network 1204 may, in various embodiments, depend on the weights to be applied to selected terms 1208.

Combiner circuit 1205 is configured to combine weighted terms 1209 with operand 103 to generate approximation result 1210. In various embodiments, to combine weighted terms 1209, combiner circuit 1205 may be further configured to add weighted terms 1209 and operand 103 to generate approximation result 1210. In cases, where hierarchical triangle generator employs conditional negation to generate triangle data instead of two's complement, combiner circuit 1205 may be further configured to add 1 to each of weighted terms 1209 to recover accuracy lost by using conditional negation. In various embodiments, combiner circuit 1205 may be implemented using multiple single-bit adder circuits configured to add an input bit and a carry-in bit to generate an output bit and a carry-out bit.

By adjusting selection circuit 1203 and weighting network 1204, interpolation circuit 1200 can be used to approximate addition function besides $x^2$. For example, in various embodiments, interpolation circuit 1200 can be employed to generate approximations of $\sqrt{x}$, $\sin x$, or any other suitable function. It is contemplated that, in some embodiments, selection circuit 1203 and weighting network 1204 may be adjustable such that interpolation circuit 1200 can be used to approximate different functions at different times.

Figure 13A:
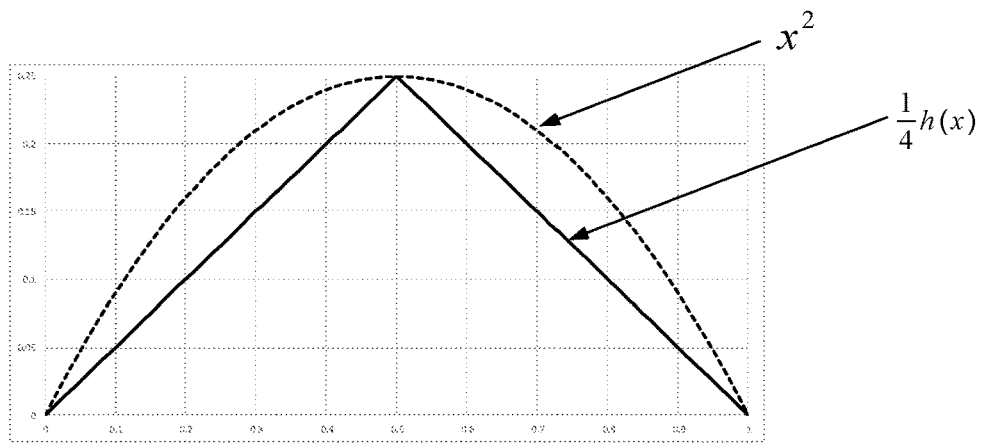
FIGS. 13A-C depict a series of graphs illustrating an improvement in accuracy of approximating a function.
Figure 13B:
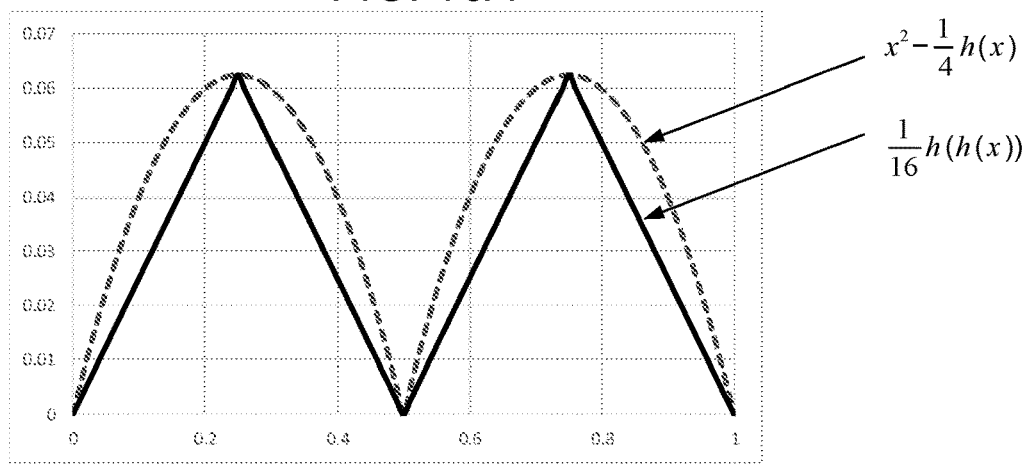
Figure 13C:
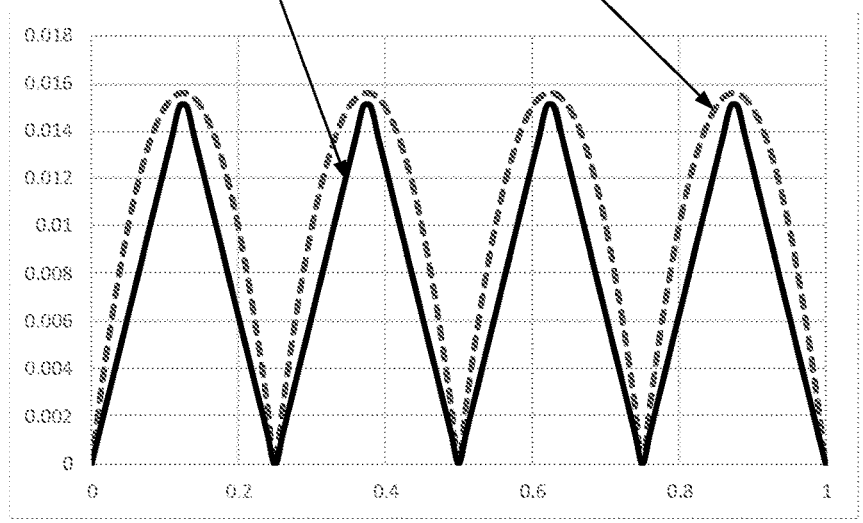

The graphs of FIGS. 13A-C further illustrate the improvement in accuracy with the addition of terms. FIG. 13A depicts the function $x^2$ over the unit interval along with the first term of the interpolation function as defined in Equations 15a and 15b (i.e., ¼ h(x)). While the first term of Equation 15a matches the function $x^2$ at three points, there is a difference between the function $x^2$ and the first term over the remaining points of the unit interval.

Turning to FIG. 13B, the difference over the unit interval between the first term of Equation 15 and the function $x^2$ is plotted along with 1/16 h(h(x)), which is the second term of Equation 15. As noted above, the second term of Equation 15 has two triangles, which match the residue generated by subtracting the first term from the function $x^2$. In this case, the difference between the residue and the second term is less than the difference depicted in FIG. 13A.

The effect of the inclusion of the next term of Equation 15 is depicted in FIG. 13C. As illustrated, the difference between the function $x^2$ and 1/16 h(h(x)) is plotted along 1/64 h(h(h(x))). The third term of Equation 15 includes four triangles, which match the residue generated by subtracting the second term of Equation 15 from the function $x^2$.

It is noted that further improvement to the accuracy of the approximation of $x^2$ may be made with the addition of additional terms, thereby by allowing a circuit designer to trade off circuit complexity, power consumption, and the like, against a level of accuracy desired for a given application.

Figure 14:
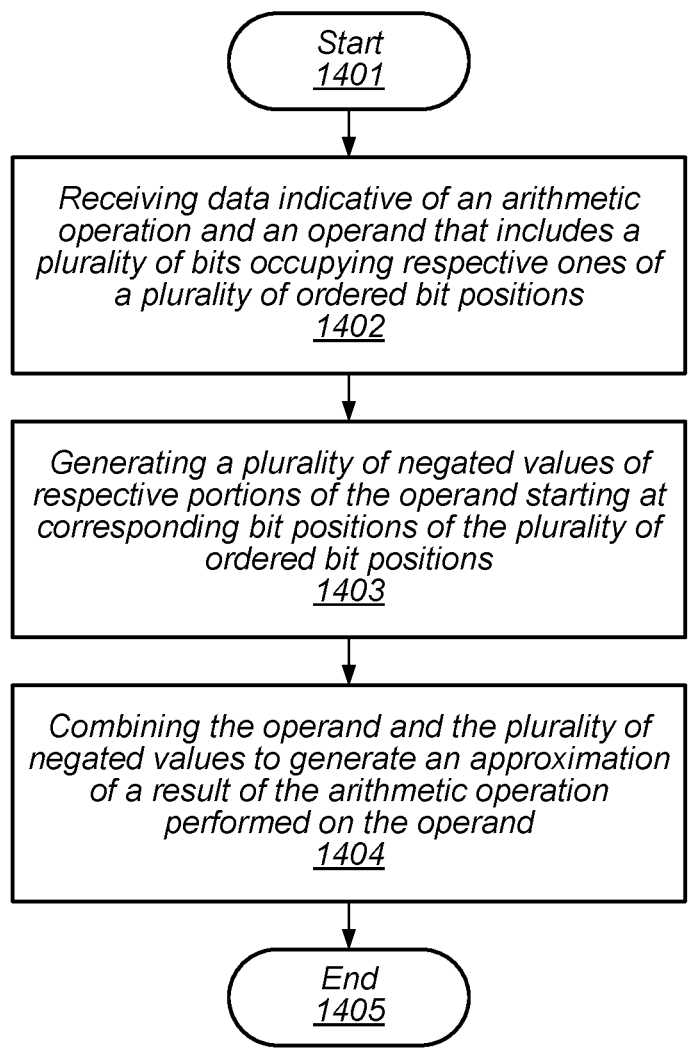
FIG. 14 is a flow diagram depicting an embodiment of a method for operating an interpolation circuit.

Turning to FIG. 14, a flow diagram depicting an embodiment of a method for operating an interpolator circuit is illustrated. The method, which may be applied to interpolator circuit 100, begins at block 1401.

The method includes receiving data indicative of an arithmetic operation and an operand that includes a plurality of bits occupying respective ones of a plurality of ordered bit positions (block 1402). In some embodiments, the arithmetic operation includes a squaring function or a sine function.

The method also includes generating a plurality of negated values of respective portions of the operand starting at corresponding bit positions of the plurality of ordered bit positions (block 1403). In various embodiments, generating the plurality of negated values includes performing a plurality of exclusive-OR operations using a bit value at a particular bit position of the ordered bit positions and respective ones of the remaining set of bits of the plurality of bits to generate a plurality of results, and adding the bit value at the particular bit position and a sum of the plurality of result bits. In some embodiments, the remaining set of bits occupy bit positions of the plurality of ordered bit positions that are less significant than the particular bit position.

The method further includes combining the operand and the plurality of conditionally negated values to generate an approximation of a result of the arithmetic operation performed on the operand (block 1404). In various embodiments, a number of negated values included in the plurality of negated values is based on a particular accuracy associated with the approximation. In some embodiments, combining the operand and the plurality of negated values includes subtracting the plurality of negated values from the operand.

Figure 15:
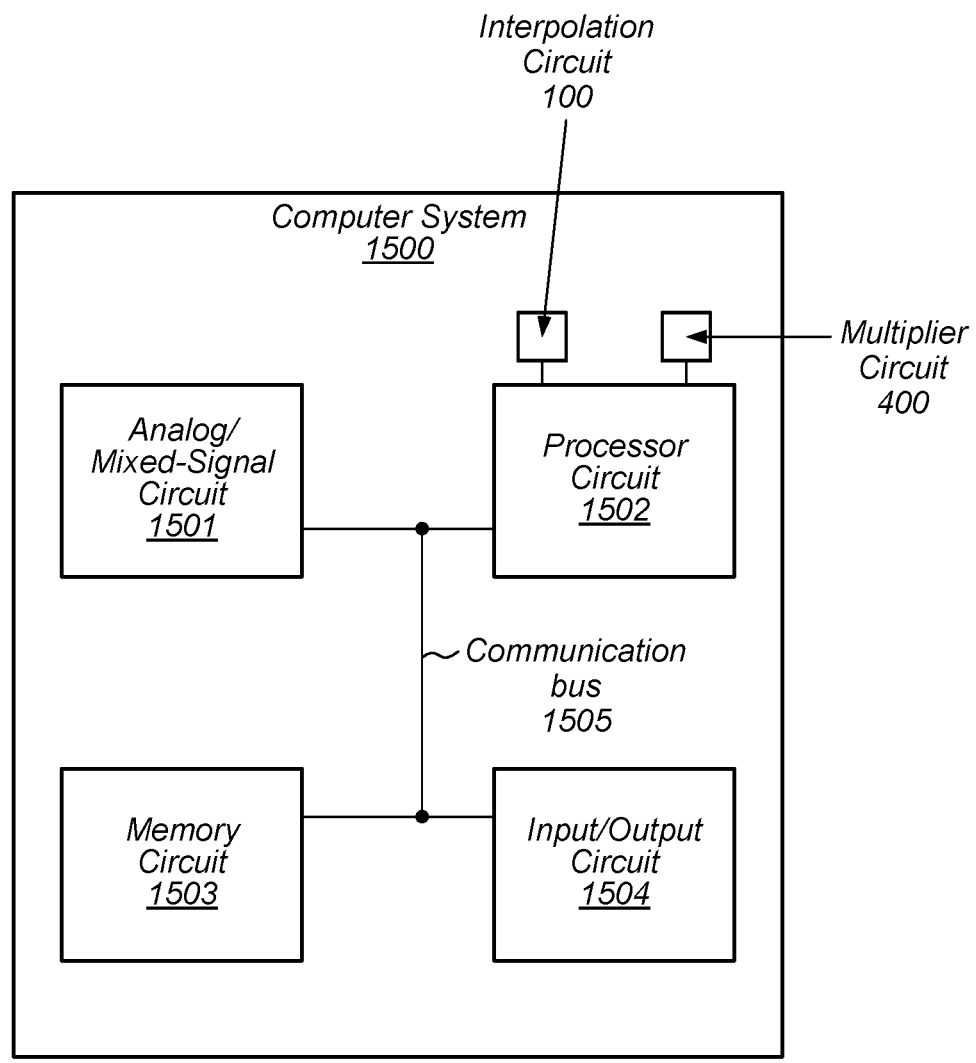
FIG. 15 illustrates a block diagram of a computer system.

A block diagram of a computer system is illustrated in FIG. 15. In the illustrated embodiment, computer system 1500 includes analog/mixed-signal circuits 1501, processor circuit 1502, memory circuit 1503, and input/output circuits 1504, each of which is coupled to communication bus 1505. In various embodiments, computer system 1500 may be a system-on-a-chip (SoC) and/or be configured for use in a desktop computer, server, or in a mobile computing application such as, e.g., a tablet, laptop computer, or wearable computing device.

Analog/mixed-signal circuits 1501 may include a crystal oscillator circuit, a phase-locked loop circuit, an analog-to-digital converter (ADC) circuit, and a digital-to-analog converter (DAC) circuit (all not shown). In other embodiments, analog/mixed-signal circuits 1501 may be configured to perform power management tasks with the inclusion of on-chip power supplies and voltage regulators.

Processor circuit 1502 may, in various embodiments, be representative of a general-purpose processor that performs computational operations. For example, processor circuit 1602 may be a central processing unit (CPU) such as a microprocessor, a microcontroller, an application-specific integrated circuit (ASIC), or a field-programmable gate array (FPGA). In various embodiments, processor circuit 1502 is coupled to interpolation circuit 100 or multiplier circuit 400. Although in the embodiment of FIG. 15, interpolation circuit 100 and multiplier circuit 400 are depicted as being directly coupled to processor circuit 1502, in other embodiments, processor circuit 1502 may communicate with interpolation circuit 100 or multiplier circuit 400 via communication bus 1505 or any other suitable communication mechanism.

Memory circuit 1503 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although a single memory circuit is illustrated in FIG. 15, in other embodiments, any suitable number of memory circuits may be employed.

Input/output circuits 1504 may be configured to coordinate data transfer between computer system 1500 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1504 may be configured to implement a version of Universal Serial Bus (USB) protocol or IEEE 1394 (Firewire®) protocol.

Input/output circuits 1504 may also be configured to coordinate data transfer between computer system 1500 and one or more devices (e.g., other computing systems or integrated circuits) coupled to computer system 1500 via a network. In one embodiment, input/output circuits 1504 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1504 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a plurality of exclusive-OR logic gates configured to:
   receive an operand that includes a plurality of bits occupying respective ones of a plurality of ordered bit positions; and
   perform a plurality of exclusive-OR operations using a bit value at a particular one of a plurality of ordered bit positions and respective ones of a remaining set of bits of the plurality of bits to generate a plurality of result bits, wherein the remaining set of bits occupy bit positions of the plurality of ordered bit positions that are less significant than the particular one of the ordered bit positions;
   an adder circuit that includes a plurality of single-bit adder circuits including a given single-bit adder circuit configured to add an input bit and a carry-in bit to generate an output bit and a carry-out bit, wherein the adder circuit is configured to:
   add the bit value of the particular one of the plurality of ordered bit positions and a sum of the plurality of result bits to generate a conditionally-negated value of a corresponding portion of the operand; and
   generate a corresponding term of one or more of terms using the conditionally-negated value and a value of a bit occupying the particular one of the ordered bit positions; and
   an output circuit that includes a plurality of flip-flop circuits arranged in a chain, in which an output of a particular flip-flop circuit is coupled to an input of a next flip-flop in the chain, wherein the output circuit is configured to combine the operand and the one or more of terms to generate an approximation of a result of an arithmetic operation performed on the operand.

2. The apparatus of claim 1, wherein to combine the operand and the one or more terms, the output circuit is further configured to reduce the one or more terms from the operand.

3. The apparatus of claim 1, wherein the output circuit is further configured to:
   perform a shift operation on the one or more terms to generate one or more shifted terms;
   perform a shift operation on the operand to generate a shifted operand; and
   combine the shifted operand and the one or more shifted terms to generate the approximation.

4. The apparatus of claim 1, wherein the arithmetic operation includes a squaring function.

5. The apparatus of claim 1, wherein the arithmetic operation includes a transcendental or algebraic function.

6. The apparatus of claim 1, wherein the arithmetic operation includes a sine function.

7. A method, comprising:
receiving, by a plurality of exclusive-OR gates, data indicative of an arithmetic operation and an operand that includes a plurality of bits occupying respective ones of a plurality of ordered bit positions;
performing, by the plurality of exclusive-OR gates, a plurality of exclusive-OR operations using a bit value at a particular bit position of the plurality of ordered bit positions and respective ones of a remaining set of bits of the plurality of bits to generate a plurality of result bits, wherein the remaining set of bits occupy bit positions of the plurality of ordered bit positions that are less significant than the particular bit position;
adding, by an adder circuit that includes a plurality of single-bit adder circuits, the bit value at the particular one of the plurality of ordered bit positions and a sum of the plurality of result bits to generate a particular conditionally-negative value of a plurality of conditionally-negated values of respective portions of the operand;
wherein adding the bit value at the particular one of the plurality of ordered bit positions and the sum of the plurality of result bits includes adding, by a given single-bit adder circuit of the plurality of single-bit adder circuits, adding the bit value and a carry-in bit from a proceeding stage of the plurality of single-bit adder circuits to generate an output bit and a carry-out bit; and
combining, by an output circuit that includes a plurality of flip-flop circuits arranged in a chain, in which an output of a particular flip-flop circuit is coupled to an input of a next flip-flop in the chain, the operand and the plurality of conditionally-negated values to generate an approximation of a result of the arithmetic operation performed on the operand.

8. The method of claim 7, further comprising transforming the plurality of conditionally-negated values into a basis mapped to the arithmetic operation, wherein the basis includes a plurality of terms.

9. The method of claim 8, further comprising selecting a subset of the plurality of terms to generate a plurality of selected terms.

10. The method of claim 9, further comprising:
applying respective weights to the plurality of selected terms to generate a plurality of weighted terms; and
combining the plurality of weighted terms and the operand to generate the approximation of the result.

11. The method of claim 10, wherein to combining the plurality of weighted terms includes:
performing a shift operation on the one or more terms to generate one or more shifted terms;
performing a shift operation on the operand to generate a shifted operand; and
combining the shifted operand and the one or more shifted terms to generate the approximation.

12. The method of claim 7, wherein the arithmetic operation includes a squaring function.

13. The method of claim 7, wherein a number of conditionally-negated values included in the plurality of conditionally-negated values is based on a particular accuracy associated with the approximation, and wherein the arithmetic operation includes a square root function.

14. The method of claim 7, wherein the arithmetic operation includes a sine function.

15. The method of claim 7, wherein the arithmetic operation includes a transcendental function.

* * * * *